Patented June 23, 1936

2,045,275

UNITED STATES PATENT OFFICE 2,045,275

VULCANIZATION OF RUBBER

Percy J. Leaper, Naugatuck, Conn., assignor to United States Rubber Products, Inc., New York, N. Y., a corporation of Delaware No Drawing. Application April 27, 1935, Serial No. 18,538

15 Claims. (Cl. 18—53)

This invention relates to improvements in the vulcanization of rubber and more particularly to the use of a new class of vulcanization accelerators.

An object of this invention is to provide a class of accelerators different from and commercially more desirable than compounds of the same general class which are already known. The new materials are readily prepared, are relatively stable, and exhibit delayed-action characteristics which favors less scorching of the rubber on the mill.

The new accelerators are broadly acylene bis-thiocarbamyl sulfiides, wherein two dithiocarbamate residues are joined to the residue of a dibasic acid, and correspond to the general formula $$\begin{array}{c} X \\ \diagdown \\ Y \end{array} N-C-S-R-S-C-N \begin{array}{c} X \\ \diagup \\ Y \end{array}$$
$$\quad\;\; \| \qquad\quad \| $$
$$\quad\;\; S \qquad\quad S $$

where R is an acylene radical, that is, the dibasic residue of a dicarboxylic acid of the aliphatic or aromatic series; X and Y are substituted or unsubstituted, similar or dissimilar, alkyl, aralkyl, aryl or cyclo-alkyl radicals exemplified by such as methyl, ethyl, propyl, butyl, benzyl, phenyl, tolyl, naphthyl, cyclo-hexyl, or may together form a heterocyclic ring with the nitrogen as exemplified by such as piperidyl and morpholyl. The parent dibasic acid may belong to the benzene, naphthalene, anthracene or diphenyl series, or may be an aliphatic dicarboxylic acid. The materials may be prepared by reacting an alkali-metal salt of a dithiocarbamic acid with a di-acid halide preferably in water solution.

The following example is given to illustrate the invention in connection with a preferred member.

Example 1.—The reaction product of phthalyl chloride and sodium dimethyldithiocarbamate: assuming that phthalyl chloride in its stable form is entirely of the symmetrical form, the reaction product is considered to have the formula

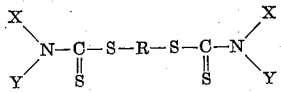

and is referred to as phthalyl bis-dimethyldithiocarbamate.

Into about 910 grams of an aqueous solution containing about 2 gram-molecular amounts of sodium dimethyl dithiocarbamate are slowly introduced with cooling about 210 grams of phthalyl chloride. On standing a yellow solid precipitates and may be removed by filtration and thoroughly washed with water and filtered to further purify it. The product analyzes about 7.53% N and 34.1% sulphur; when purified by re-crystallization, it has a melting point of 79–80° C.

A typical tire tread compound containing the new accelerator was tested as given below. Composition of tread compound (parts by weight):

| | Parts |
|---|---|
| Smoked sheets | 100.00 |
| Carton black | 45.00 |
| Zinc oxide | 5.00 |
| Pine tar | 3.50 |
| Zinc soap of cocoanut oil acids | 1.25 |
| Sulphur | 3.25 |
| Acetone-diphenylamine condensate (antioxidant) | 1.00 |
| Accelerator | .40 |

T is tensile in pounds per sq. in. at break; E is percent elongation at break.

*Scorch test*

| Cure in minutes at 5 pounds per sq. in. steam pressure | T | E |
|---|---|---|
| 27 | No Cure | |
| 35 | 256 | 756 |
| 45 | 657 | 657 |
| 60 | 3230 | 706 |

*Unaged*

| Cure in minutes at 45 pounds per sq. in. steam pressure | T | E |
|---|---|---|
| 20 | 4130 | 703 |
| 30 | 4300 | 690 |
| 45 | 4050 | 680 |
| 60 | 3980 | 680 |
| 75 | 3800 | 666 |

*Aged (48 hours in oxygen at 300 lbs. pressure @ 70° C.)*

| Cure in minutes at 45 pounds per sq. in. steam pressure | T | E |
|---|---|---|
| 20 | 3340 | 663 |
| 30 | 3250 | 613 |
| 45 | 3160 | 560 |
| 60 | 3040 | 570 |
| 75 | 2850 | 540 |

Examples of other acylene residues that may be substituted are those corresponding to such as malonic, succinic and naphthalic acids as well as those of the dephenyl series such as diphenic acid.

The accelerators may be used in other desired amounts different from that shown and with other compounding ingredients and other proportions of ingredients and in any type of rubber stock. Furthermore, the accelerators of the invention may be used in conjunction with any other well known accelerators, the use of such a combination of accelerators offering the well known advantage that the scorching tendency, rate of vulcanization and properties of the vulcanized product may be varied and controlled by varying the selection and proportion of the accelerators used.

The accelerators may be introduced into the rubber in any known manner as by incorporating them on a mill in the dry form or in solution, or by diffusion from a surrounding liquid medium which may also act as the vulcanizing medium.

The term rubber is to be construed broadly as including caoutchouc, balata, gutta percha, rubber isomers, synthetic rubber in either solid or liquid form, and is applicable to latex whether naturally occurring or artificially prepared.

Having thus described my invention what I claim and desire to protect by Letters Patent is:

1. A process of producing vulcanized rubber products which comprises incorporating in rubber a vulcanizing agent and an acylene bis-N-disubstituted thiocarbamyl sulfide, where acylene refers to the acyl group of a dicarboxylic acid.

2. A process of producing vulcanized rubber products which comprises incorporating in rubber a vulcanizing agent and an aromatic-acylene bis-N-disubstituted thiocarbamyl sulfide, where aromatic-acylene refers to the acyl group of an aromatic dicarboxylic acid.

3. A process of producing vulcanized rubber products which comprises incorporating in rubber a vulcanizing agent and an acylene bis-thiocarbamyl sulfide in which acylene refers to the acyl group of a dicarboxylic acid of the benzene series.

4. A process of producing vulcanized rubber products which comprises incorporating in rubber a vulcanizing agent and a compound of the type

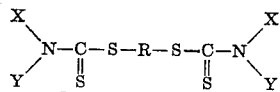

R being the acyl group of a dicarboxylic acid; X and Y each representing a hydrocarbon group which may be joined in the form of a heterocyclic ring, and vulcanizing the rubber.

5. A process of producing vulcanized rubber products which comprises incorporating in rubber a vulcanizing agent and an acylene bis-N-disubstituted thiocarbamyl sulfide where acylene refers to the acyl group of a dicarboxylic acid, and vulcanizing the rubber.

6. A process of producing vulcanized rubber products which comprises incorporating in rubber a vulcanizing agent and an acylene bis-N-dialkyl thiocarbamyl sulfide where acylene refers to the acyl group of a dicarboxylic acid and vulcanizing the rubber.

7. A process of producing vulcanized rubber products which comprises incorporating in rubber a vulcanizing agent and a phthalyl bis-N-disubstituted thiocarbamyl sulfide, and vulcanizing the rubber.

8. A process of producing vulcanized rubber products which comprises incorporating in rubber a vulcanizing agent and a phthalyl bis-N-dialkyl thiocarbamyl sulfide and vulcanizing the rubber.

9. A process of producing vulcanized rubber products which comprises incorporating in rubber a vulcanizing agent and a phthalyl bis-N-dimethyl thiocarbamyl sulfide and vulcanizing the rubber.

10. An accelerating compound which is an acyl bis-N-disubstituted dithiocarbamate in which the acyl group corresponds to that of a dibasic acid.

11. An accelerating compound which is a phthalyl N-di-substituted dithiocarbamate.

12. An accelerating compound which is a phthalyl bis-dialkyl dithiocarbamate.

13. A rubber composition comprising rubber and an accelerating compound of the type set forth in claim 4.

14. A rubber composition comprising rubber and a phthalyl bis-dialkyl dithiocarbamate.

15. A vulcanized rubber product resulting from a process as set forth in claim 4.

PERCY J. LEAPER.